June 6, 1967 — E. S. MURPHY — 3,323,306
HYDRODYNAMIC TRANSMISSION SYSTEM
Filed Nov. 23, 1965 — 2 Sheets-Sheet 1
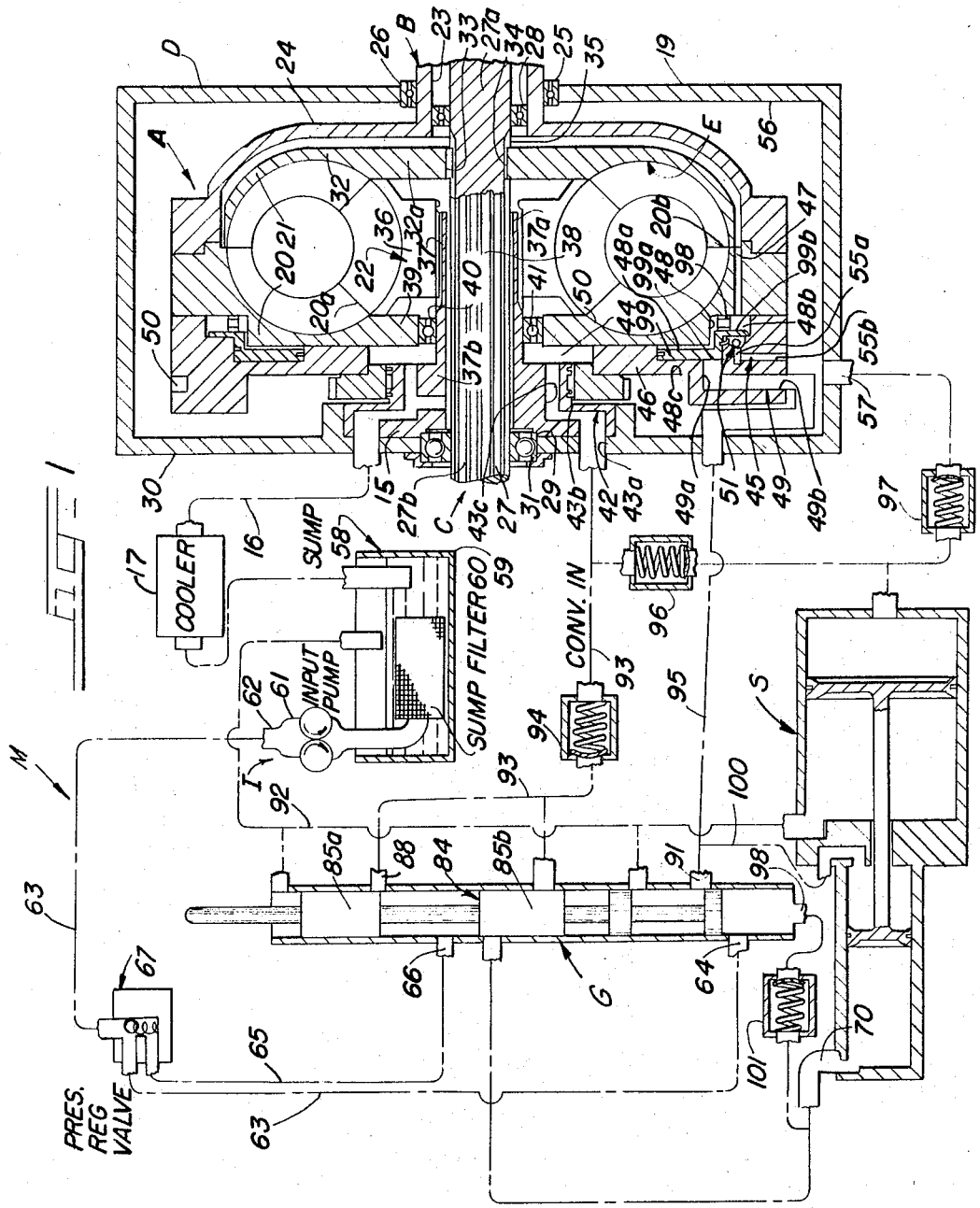
INVENTOR
EUGENE S. MURPHY
BY Joseph W. Malleck
ATTY

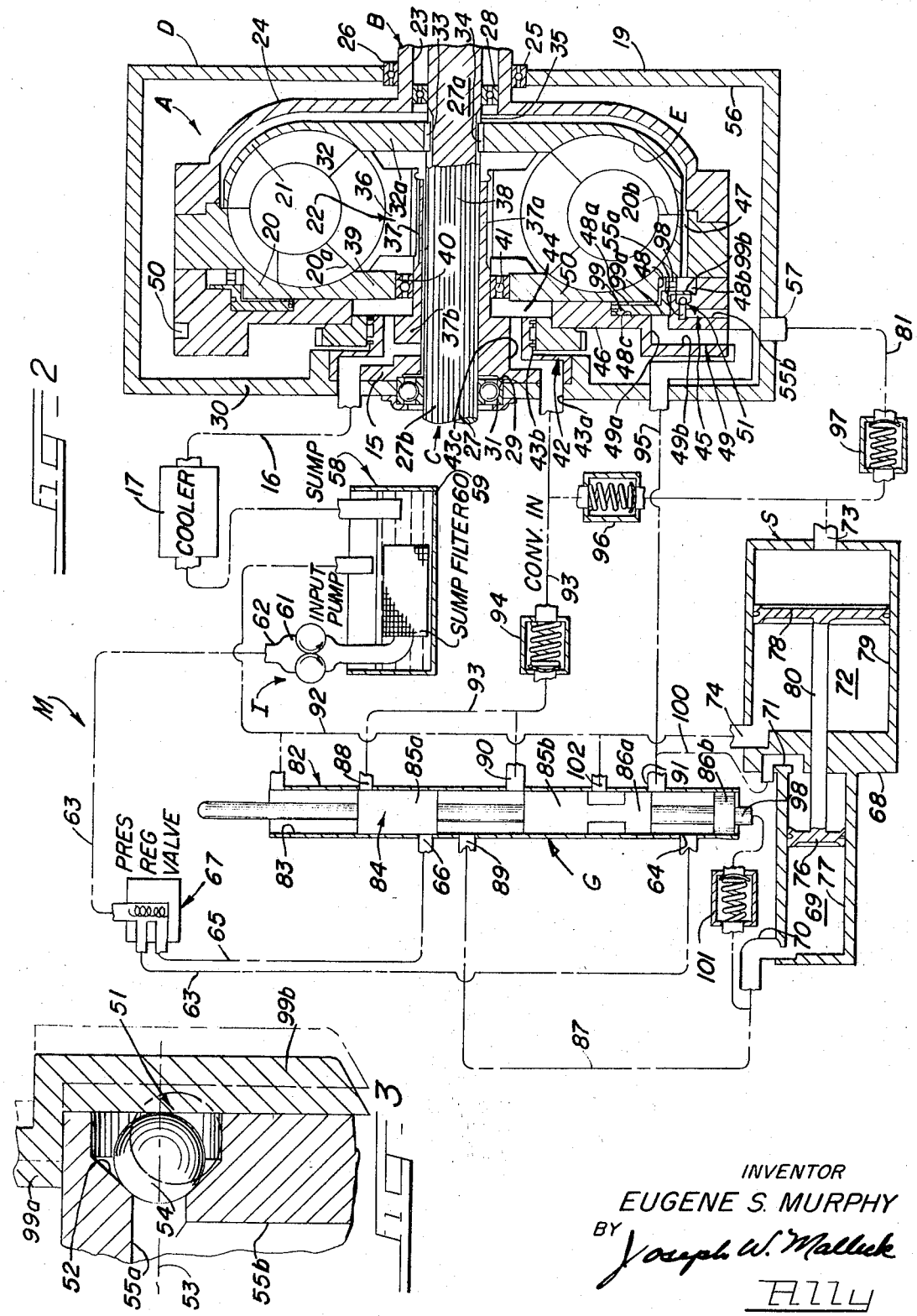

United States Patent Office 3,323,306
Patented June 6, 1967

3,323,306
HYDRODYNAMIC TRANSMISSION SYSTEM
Eugene S. Murphy, Rockford Township, Winnebago County, Ill., assignor to Borg-Warner Corporation, a corporation of Illinois
Filed Nov. 23, 1965, Ser. No. 509,276
7 Claims. (Cl. 60—54)

ABSTRACT OF THE DISCLOSURE

A transmission having a hydrokinetic torque converter and a hydraulic control circuit employing multiple-spool valve selectively positionable for, on the one hand, effecting continuous filling of the converter at a certain pressure, and on the other hand, for actuating a dual piston syringe for quickly withdrawing and storing the fluid contents of the converter and quickly returning said stored fluid to the converter when filling is again desired, the syringe actuation being useful to smoothly interrupt the power flow of the converter.

---

This invention relates to power transmitting mechanisms and more particularly to transmission drives employing a hydraulic torque converter and a control system effective to quickly reduce or increase the fluid contents of said torque converter for varying its ability to transmit power. This is a continuation in part application of my co-pending application U.S. Ser. No. 413,183, now abandoned.

For purposes such as switching operations for varying the speed ratio within a transmission, the torque converter in series therewith offers, certain problems. An engine or prime mover normally used with heavy equipment such as earth moving equipment employing a fluid torque converter and mechanical transmission, can be controlled downwardly in speed to an idling speed which is sometimes relatively high compared to the speed at which the torque converter should be working for permitting ratio changes. At such idling speed, the torque converter still requires such power that an operation with very low pulling forces at simultaneously low driving speeds, as for instance for switching of gears, cannot be obtained without certain difficulties. This deficiency is particularly noticeable with drives comprising diesel engines where the idling speed is approximately 40% of its maximum speed. This lower power limit is too high for proper switching operations, particularly with drives of a high output.

As a remedy to obviate this problem the prior art has suggested such mechanisms as tiltable blades within the torque converter or means interrupting the toroidal flow for reducing the torque converter power transmission. However, each of these mechanisms have normally been of a rather complex nature compared to the disclosure of the invention herein.

Therefore, it is a primary object of this invention to provide an improved hydraulic transmitting mechanism which more effectively and more rapidly adjusts to a reduced power condition for permitting such operations as gear ratio changes.

A more specific object of this invention is to employ syringe means which may be selected for quickly withdrawing the contents of fluid within the torque converter and effective to selectively restore said contents upon the resumption of full power transmission after a ratio change.

Yet another object of this invention is to provide a power transmitting mechanism employing a hydraulic torque converter with a toroidal chamber which may be emptied by employment of a syringe means and restored with fluid contents selectively, said syringe means being particularly characterized by stepped chambers, one of said chambers being an actuating chamber and the other a working chamber, each chamber having a piston therein and interconnected for common action, said working piston being effective to withdraw or restore fluid to said toroidal chamber and said actuating piston being effective to multiply the supply pressure of said system to position or move said working piston.

Other objects and advantages of this invention will become more apparent from the following detailed description taken in connection with the accompanying drawings, in which:

FIGURE 1 is a substantially schematic illustration of a power transmitting mechanism employing a hydraulic torque converter and a hydraulic control system therefor shown in one operative condition, certain portions of said system being shown in central sectional view;

FIGURE 2 is a schematic illustration like FIGURE 1 illustrating said system in another operative condition; and FIGURE 3 is an enlarged fragmentary sectional view of a portion of the fluid outlet means of the torque converter of FIGURE 1.

Turning now to the drawings, the power transmitting mechanism is broadly comprised of: a hydraulic torque converter A having rotative input means B and rotative output means C, said torque converter employs conventional bladed elements including an impeller 20, a rotatable turbine 21 and a reaction or stator member 22. The torque converter is supported and enclosed within a stationary housing D which acts as a reservoir for fluid leaving the toroidal chamber E of said torque converter. A fluid circulatory system or means M comprises a pressurized fluid supply means I effective to introduce fluid to the toroidal chamber of said torque converter and maintain a filling of same, a syringe means S effective to withdraw or restore the fluid contents of said fluid torque converter quickly and effectively for reducing the power transmitting capabilities thereof, and a selector means G for conditioning said system.

Turning in more particularity to the components thereof, the input means B comprises a hollow driving shaft 23 carrying a driving flange 24 at one end thereof which is disposed within the housing D. The driving shaft 23 is journalled by bearing 26 mounted in opening 25 formed within the front wall 19 of housing D. The output means C comprises a driven shaft 27 having one end 27a journalled within the interior of the hollow drive shaft 23 by bearing 28 and another portion 27b journalled within an opening 29 of the rear wall 30 of the housing D by bearing 31.

The torque converter A has turbine 21 provided with a wheel-like body 32 having a hub 32a; the hub has a central opening 33 provided with splines 34 drivingly intermeshed with splines 35 formed on the driven shaft 27. The annular stator 22 has a hub 36 splined to a sleeve 37 disposed concentrically about the output shaft 37 and carries a plurality of splines 38 at one end 37a thereof intermeshed with the splines 39 of the hub 36. The other end 37b of the sleeve 37 is provided with a drum 15 secured to the housing D. The impeller 20 has an annular body 39 provided with a central opening 40 for receiving a bearing 41 for journalling said impeller.

The inner walls of said wheeled elements, the impeller, turbine and stator, together define the toroidal fluid chamber E. The torque converter is provided with a fluid inlet means 42 defined in said drum 15 and comprises a series of conduits 43a, 43b, and 43c communicating with a space 44 defined between the impeller wall 39 and the drum 15 wherefrom fluid may flow past the bearing 41 supporting the impeller and to the leading edge 20a of the impeller.

Fluid outlet means 45 is defined in part within the impeller shell 20 of the torque converter and in part within a block 46 attached to the impeller shell. The outlet means 45 comprises a first conduit 47 communicating the trailing edge 20b of the impeller at a radially outermost position with offset communicating chambers 48a and 48b. An axial bore 55a and a radial bore 55b communicate chamber 48b with the interior of the housing D. Another conduit 49 (having an axial component 49a and a radial component 49b) communicates chamber 48a with a groove 50 in the outer portion of the housing D. Conduit 49 is normally maintained closed by a stepped piston 99 slidable within the offset chambers 48a and 48b. Piston 99 is urged in a leftward direction, as viewed in FIGURE 1, by a return spring 98 so that end face 99a of the stepped piston abuts the inner wall 48c and thereby closes communication to conduit 49. The portion of the stepped piston carrying face 99a is in sealing relationship with the chamber 48a by suitable seals and face 99a is selectively subject to the supply means pressure transmitted by conduit 95. However, until such time as the selector valve is placed in a position where conduit 95 is supplied with fluid pressure, the return spring 98 is sufficient to maintain said face 99a in a closed position.

Outlet means 45 is controlled by an auxiliary dumping valve 51 (see FIGURE 3) which is dependent upon operation in conformity with the movement of piston 99. Valve 51 comprises a conically shaped valve seat 52 defined between the intersection of the axial bore 55a and chamber 48b. The conical shaped valve seat 52 has an axis 53 generally coincident with the axis of bore 55a. A valve member 54, formed as a spherical ball is disclosed adjacent said valve seat and when free will normally roll outwardly upon the conical valve seat in response to centrifugal forces thereby normally tending to maintain said outlet 45 open; however, in all instances where the piston 99 is urged to a closed position, as illustrated in FIGURE 1, portion 99b of the piston will contact and urge the valve member to a position centered within the valve seat as shown in full line in FIGURE 2. In the open position of piston 99, centrifugal forces on the fluid adjacent the valve seat will not be sufficient to prevent the higher density valve member from rolling outwardly under influence of centrifugal forces.

The interior wall 56 of the housing is spaced from the outer surfaces of the torque converter A and has an outlet conduit 57, for withdrawing fluid, which is in communication with the syringe means S as will be described. When outlet means 45 is open there will be a rapid emptying of the chamber E by a fast flow rate therethrough as urged by centrifugal forces.

Turning now to the circulatory system or means M, the supply means I comprises a sump having a reservoir container 59 and a sump filter 60 from which is drawn hydraulic fluid by an input pump 61 which may be of any typical construction, such as those having rotary gears. The outlet 62 of the pump has a first conduit 63 communicating with a first fluid inlet 64 of the selector means G and a second conduit 65 communicating with a second fluid inlet 66 of the selector means. The conduit 63 has a pressure regulator valve 67 disposed therein effective to maintain a high predetermined pressure (here about 250 p.s.i.) therein for operating the syringe means and the bleed or spill-off of said regulator valve being effective to maintain a lower pressure (here about 60 p.s.i.) for operating the torque converter.

The syringe means S, forming part of the circulatory means M, comprises a housing 68 having chambers of differential sizes provided therein, the first being an actuating chamber 69 having first and second fluid inlets 70 and 71 respectively provided therein at opposite ends. The second chamber 72 is a working chamber of considerably greater volume having a first fluid inlet 73 and an outlet 74 connected with exhaust for return to sump. An actuating piston 76 is slidable in sealing relationship with the interior 77 of the first chamber 69 and is adapted to be moved by pressure introduced by either one of the inlets 70 or 71 to either side of the actuating piston 76. Another piston 78, being a working piston, is provided in the larger working chamber 72 is sliding sealing engagement with interior walls 79 and is commonly inter-connected with the actuating piston by tie rod 80 for synchronous movement. The fluid inlet 73 to the working chamber has a conduit 81 in communication with the conduit 57 leading from the housing D which in turn is in communication with the fluid outlet means of the torque converter.

The selector means G comprises, as a preferred suggestion, a valve body 82 having a cylindrical bore 83 provided with a slidable valve member 84 therein; the valve member has a pair of spaced lands 85a and 85b at its upper portion and a pair of spaced lands 86a and 86b at the lower portion thereof, each land being in sliding sealing engagement with the interior wall of bore 83. The valve body is provided with the first fluid inlet 66 normally in communication with low pressure fluid and a first fluid outlet 88 spaced from fluid inlet 66 so that they may be communicated by the spacing between lands 85a and 85b when the valve is in the upper position as viewed in FIGURE 1. First fluid outlet 88 is connected to the fluid inlet means 42 for the converter by way of a passage or conduit 93 having a one-way check valve 94 interposed therein so that pressurized fluid will be permitted to move in the direction of the torque converter. A second fluid inlet 64 is provided at the lower portion of the valve body 82 normally in communication with high pressure fluid; a second fluid outlet 98 is disposed at the bottom of the body 82 connected to fluid inlet 70 (at the left-hand side of the actuating chamber 69) for the syringe means S. A directional check valve 101 is interposed in the connection between outlet 98 and inlet 70 to permit fluid to flow only toward the inlet 70. The inlet 64 and outlet 98 are located so that when the valve member 84 is in the uppermost position as viewed in FIGURE 1, they will be communicated for conveying the high fluid pressure to the actuating chamber for urging piston 76 in a right-hand direction.

For purposes of de-activating the torque converter and permitting the syringe means to quickly empty the fluid contents thereof, the valve body 82 is provided with a third fluid outlet 91 in communication with the second fluid inlet 71 by way of conduit 100 leading to the actuating chamber (disposed at the right-hand side thereof as viewed in FIGURES 1 and 2). Outlet 91 is spaced from inlet 64 so that they will be communicated by the spacing between lands 86a and 86b when the member 84 is in the lowermost position of FIGURE 2 and uncommunicated when in the position of FIGURE 1. A conduit 95 is also connected to conduit 100 and communicates with the left-hand face 99a of the stepped piston 99, so that the outlet means 45 will be urged to an open condition by high pressure fluid when the valve 84 is in the position of FIGURE 2 (simultaneous with the actuation of piston 76 to the left). To permit fluid to the left of the piston 76 in the actuating chamber to drain to the torque converter during the condition of the valve member 84 shown in FIGURE 2, ports 90 and 89 are offset from inlet 66 to be interrupted by land 85b in the position of FIGURE 1 and communicated by the spacing between lands 85a and 85b in the other position. Port 89 connects to inlet 70 by conduit 87 and port 90 connects to conduit 93. A suitable sump communicating conduit 92 is arranged to normally connect the upper portion of bore 83 and inlet 74 of chamber 72 with the sump and has outlets 102 connected to sump when the valve is in the position of FIGURE 2 to reduce the pressure between lands 85b and 86a. By virtue of means G, the circulatory means M, depicted for the operation of the torque converter of the preferred embodiment, is capable of being placed in either of two conditions. A first condition of the circulatory means M is achieved by stationing the valve member 84 of the selector means G in the position as shown in FIGURE 1. In such condition, the torque converter is supplied with relatively low pressure hydraulic fluid maintained at such level by the regulator valve 67 and thereby maintains the converter chamber full of fluid for normal operating conditions. Fluid is normally continuously circulated through the converter and returned to sump by way of conduit 16 which has a cooler 17 interposed therein. To this end, the speed lands 85a and 85b will be spaced apart a distance effective to communicate first fluid inlet 66 with the first outlet 88 and sends fluid pressure along conduit 93 to the fluid inlet 42 of the torque converter (ports 90 and 89 are blocked in this condition). Simultaneously, high pressure fluid is communicated between fluid inlet 64 and outlet 98 leading to the fluid inlet 70 for the syringe means S and thereby biasing the actuating piston 76 to the right as shown in FIGURE 1. The working piston 78 will also be biased to the extreme right position resulting in an emptying of the working chamber to the right-hand side of piston 76, as viewed in FIGURE 1. In such first condition of the circulatory means, the fluid outlet 45 for the torque converter is closed with the outwardly facing side 99a of the stepped piston 99 not subject to supply pressure and thereby urged by spring means 98 to move ball valve 54 tightly into the valve seat 52. Directional check valves 97 and 96 are effective to permit fluid to drain from conduit 81 and inlet 73 toward conduit 93 leading to the torque converter; drain through check valve 96 is powered by the action of working piston 78 which is moving to an extreme right position. Similarly inlet 71 of the actuating chamber and conduit 95 are placed in communication with sump by communicating ports 91 and 102.

To achieve the second condition of the circulatory means M the selector valve is moved downwardly whereby land 85a blocks communication between first fluid inlet 66 and the first fluid outlet 88 and at the same time the spacing between lands 85a and 85b communicates ports 89 and 90 to drain fluid at the left-hand of the actuating piston 76 to the torque converter. The spacing between lands 86a and 86b communicate the second fluid inlet 66 and the second fluid outlet 91 so that high fluid pressure is applied to the fluid inlet 71 for the actuating chamber 69 urging the actuating piston 76 in a leftward direction. This action moves the working piston 78 in a leftward direction creating a high suction effect within the expanding space to the right of the working piston 78. At the same time, conduit 95 conveys high pressure fluid from conduit 100 to the face 99a of the stepped piston 99 urging it in a rightward direction and thereby releasing the valve member 54 so that it may be influenced by centrifugal forces and roll outwardly upon the valve seat 52. With the outlet means open, fluid will pass through the conduits 47, 55a and 55b, 57 and ultimately to the fluid inlet 73 of the working chamber 72 in a very rapid sucking manner which enables a large volume of fluid to be withdrawn quickly from the toroidal chamber of the torque converter. It is true that the size of conduit 57 determines the rate of withdrawal, but this should be made large enough so that quick withdrawal is not hindered.

The system and torque converter may be returned to its torque transmitting condition by moving the selector valve back to the first condition whereby the actuating piston 76 will be urged to the position as shown in FIGURE 1, forcing all the reserve or withdrawn fluid within the working chamber 72 back into the torque converter without the necessity of slow filling as may be accomplished through the inlet conduit 93 passing through the inlet means 42.

While I have described my invention in connection with one specific embodiment, it is to be understood that this is by way of illustration and not by way of limitation and the scope of my invention is defined solely by the appended claims which should be construed as broadly as the prior art will permit.

I claim:
1. A power transmitting mechanism employing hydraulic torque conversion means, said mechanism comprising: rotative input and output means, a fluid operated torque converter means interconnecting said input and output means and having a fluid inlet and a fluid outlet for respectively and selectively admitting and exhausting said conveter means; circulatory means including supply means effective to supply pressurized fluid to said inlet for selectively maintaining a filling of said torque converter and including syringe means selectively effective to rapidly withdraw the fluid contents of said torque converter and to selectively restore said fluid contents; and selector means effective to provide a first condition of said circualtory system wherein said supply means is operative to maintain a filling of the converter means while said syringe means is operative to restore fluid to said converter means and a second condition wherein said supply means is effective to actuate said syringe means for exhausting fluid from said converter means.

2. A power transmitting mechanism as in claim 1, in which said syringe means comprises a first fluid chamber effective to receive an actuating piston slidable therein, and a second fluid chamber effective to receive a working piston slidable therein, said working piston having a substantially larger surface area than said actuating piston and said pistons being interconnected for simultaneous movement; first and second fluid inlet means communicating said first chamber with said supply means and being selectively effective to permit said actuating piston to be urged in one direction when said circulatory system is in said first condition and to be urged in an opposite direction when said circulatory system is in said second condition whereby said working piston is urged to respectively restore or exhaust fluid to said converter means.

3. A power transmitting mechanism as in claim 1, in which said fluid outlet means for said torque converter comprises a closure piston having one side thereof normally urged to a position for closing said outlet means when said circulatory means is in said first condition and said closure piston having a second or opposite side subject to said supply means for promoting opening of said outlet means when said circulatory system is in said second condition, said outlet means also comprising means which is centrifugally responsive to open said outlet means as permitted by said closure piston.

4. A power transmitting mechanism as in claim 2 in which said selector means comprises a valve having a cylindrical bore and a valve member provided with a pair of spaced lands thereon in sliding sealing relationship with said bore, said valve being particularly characterized by a provision of a first fluid outlet communicating with one of said fluid inlets to said actuating chamber of said syringe means, a second fluid outlet communicating both with said converter fluid inlet and with the other of said fluid inlets to said actuating chamber of said syringe means, a first fluid inlet extending into said bore and disposed between said valve first and second fluid outlets, said first fluid inlet communicating with said supply means, and a second fluid inlet and a third fluid outlet each extending into said bore and disposed at a side of said second fluid outlet opposite from the side at which said first fluid inlet means is disposed, lands of said valve member being spaced apart a distance effective to communicate said first fluid inlet means and said second fluid outlet means while blocking fluid communication between said second fluid inlet and said third fluid outlet, when disposed in one position to provide said first condition of said circulatory means, said spaced lands being movable to another position communicating said first fluid inlet with said first fluid outlet while placing said second fluid inlet and said third fluid outlet in fluid communication.

5. In a power transmitting mechanism, the combination comprising: a hydraulic torque converter having at least one rotatable impeller, a turbine and a stator rotatable within a toroidal chamber, rotative input means drivingly connected to said turbine, said stator being normally held against rotation in one direction, said torque converter further having fluid inlet means communicating with the leading edge of said impeller for introducing fluid into said toroidal chamber and fluid outlet means communicating with a radially outward position of said toroidal chamber, said torque converter having a shell drivingly associated with said impeller and carrying a valve block with a stepped chamber defined therein, a stepped piston provided in said stepped chamber having one face subject to the fluid pressure within said toroidal chamber and another face subject to actuating pressure for moving said piston in a direction to uncover said outlet means, and circulatory means effective to provide fluid for operating said torque converter.

6. The combination as in claim 5, in which said outlet means further comprises an auxiliary valve dependent upon the operation of said stepped piston and includes a conically shaped valve seat disposed about a portion of said converter fluid outlet and a spherical valve member effective to move outwardly along said conical seat in response to centrifugal forces as permitted by said stepped piston and thereby to fully open said outlet means.

7. The combination as in claim 6 in which said circulator means comprises: supply means including a sump, a pump for withdrawing fluid from said sump, said circulatory means also comprising syringe means having an independent actuating chamber and an independent working chamber, said working chamber being substantially larger cross-sectional area than said actuating chamber, an actuating piston slidable in said actuating chamber and a working piston slidable in said working chamber, said pistons being interconnected for common movement; conduit means interconnecting the outlet of said pump with the inlet of said actuating cylinder of said syringe means, valve means interposed in said circulatory means effective to provide a first condition of said circulatory means whereby said supply means is in communication with the inlet to said actuating chamber and also to the inlet of said torque converter said valve means being to provide a second condition of said circulatory means wherein the outlet of said pump is in communication with the opposite side of said actuating chamber and said supply means is in communication with the outward face of said stepped piston of said impeller valve block whereby said torque converter outlet means is uncovered permitting fluid to flow toward the working chamber of said syringe means, said syringe means being actuated to withdraw the contents of said torque converter for reducing the transmission of power therein.

References Cited
UNITED STATES PATENTS 2,299,883  10/1942  Dunn _____ 60—54
3,055,169   9/1962  Seibold et al. _____ 60—54 X EDGAR W. GEOGHEGAN, *Primary Examiner.*